(12) United States Patent
Varonos

(10) Patent No.: US 10,212,342 B2
(45) Date of Patent: *Feb. 19, 2019

(54) PANORAMIC WINDSHIELD VIEWER SYSTEM

(71) Applicant: Agamemnon Varonos, Luxembourg (LU)

(72) Inventor: Agamemnon Varonos, Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 15/594,098

(22) Filed: May 12, 2017

(65) Prior Publication Data

US 2017/0318221 A1 Nov. 2, 2017

Related U.S. Application Data

(63) Continuation of application No. 14/583,047, filed on Dec. 24, 2014, now Pat. No. 9,654,687.

(51) Int. Cl.
*H04N 7/00* (2011.01)
*H04N 5/232* (2006.01)
*B60R 1/00* (2006.01)
*H04N 5/225* (2006.01)
*H04N 5/262* (2006.01)

(52) U.S. Cl.
CPC ........... *H04N 5/23238* (2013.01); *B60R 1/00* (2013.01); *H04N 5/2253* (2013.01); *H04N 5/23216* (2013.01); *H04N 5/23296* (2013.01); *H04N 5/2628* (2013.01); *B60R 2300/202* (2013.01); *B60R 2300/306* (2013.01); *B60R 2300/602* (2013.01); *B60R 2300/802* (2013.01)

(58) Field of Classification Search
USPC ............................................ 348/36
See application file for complete search history.

(56) References Cited

U.S. PATENT DOCUMENTS

| 8,633,979 B2 | 1/2014 | Szczerba et al. |
| 2007/0081262 A1* | 4/2007 | Oizumi ................. B60R 1/00 359/843 |
| 2010/0259841 A1 | 10/2010 | Matsumoto |

FOREIGN PATENT DOCUMENTS

DE 102006029510 1/2008

* cited by examiner

*Primary Examiner* — William C Vaughn, Jr.
*Assistant Examiner* — Daniel Tekle
(74) *Attorney, Agent, or Firm* — Perkins Coie LLP

(57) ABSTRACT

Forward oblique blind spots of a vehicle, generated by the vehicle's front windshield pillars, are eliminated by provision of a panoramic windshield viewer system, thus allowing the driver to operate the vehicle without having his view impaired by visual obstructions that would otherwise be caused by the windshield pillars.

12 Claims, 18 Drawing Sheets

PANORAMIC WINDSHIELD VIEWER SYSTEM

CROSS-REFERENCE TO RELATED APPLICATIONS

This application is a continuation of U.S. patent application Ser. No. 14/583,047 filed 24 Dec. 2014, now U.S. Pat. No. 9,654,687, issued May 16, 2017, which is incorporated herein by reference in its entirety.

FIELD

The invention relates to improvements in visibility for the operators of motor vehicles. More particularly, the invention relates to a panoramic windshield viewer system.

BACKGROUND

Passenger safety is of primary importance in modern automobiles. Vehicle construction and design is meant to minimize passenger injuries in case of an accident. A critical element of modern vehicles is the front pillar construction to which the windshield is attached. The main role of the front pillars is to safeguard the structural integrity of the passenger cabin in case of a collision. In addition, the pillars provide a housing for oblique air-bags and, finally, they are used as the frame of the windshield.

The dual role of the front pillars as a reinforcement and housing construction has resulted in a continual increase of their size. Thus, the driver faces two forward, oblique blind spots. These blind spots are significant and, because the vehicle operator cannot see everything within the range of the vehicle's forward motion, they increase danger of a collision when the vehicle is in motion. The probability of a collision is higher at crossroads as well as at roundabout circulation. For example, FIG. 1 shows the problems attendant with the obstruction of driver's vision due to the windshield pillar when the driver of a vehicle 12 approaches a roundabout through which a vehicle 10 is proceeding on the driver's left. Here, the driver must somehow look around the pillar, which is directly in-line with the vehicle in the roundabout. FIG. 2 is a perspective drawing showing the driver's view of the roundabout of FIG. 1 and the obstruction of the driver's vision of the vehicle 10 in the roundabout caused by the windshield support pillars 20.

Known systems, such as that disclosed in US 2010/0259841, can be functional, but such systems lack universal applicability and they impose constraints in vehicle design. For example, the mirrors that are used are applicable only in a configuration of transparent glass surfaces, whereas the viewing size is finally small and distant from the driver's eyes.

SUMMARY

Embodiments of the invention provide a universally applicable panoramic windshield viewer system that eliminates the forward oblique blind spots of a motor vehicle.

A vehicle windshield is enriched with a panoramic viewer system comprising one or more digital cameras that are positioned in the external part of the vehicle, a flexible screen surrounding the inner pillar wrappers in lieu of the garment used today, and a processor that transforms and scales the digital camera input into a smooth and consistent display output.

The position of the external view cameras is oblique, preferably in the frame surrounding the headlights. The cameras are installed unobstructed and in a position that allows water cleaning by the headlamp washing system.

An alternative positioning of the cameras is in the area of the front rearview external mirrors, the base of the front pillars, or the mounting of the rain detector module. In embodiments of the invention, the positioning of the cameras ensures a proper viewing angle, and the possibility to clean the lens cover, whilst the aerodynamic impact is minimal.

An alternative or complementary set of external view cameras can be installed on the front windshield's inner side at the center, left and right of the light and rain sensor, if available.

The windshield becomes panoramic through the installation of two flexible displays surrounding the internal part of the front pillars. Typically, the front pillars contain a side airbag installation covered by a garment, leather, or similar material. In embodiments of the invention, this part is replaced by an appropriate flexible display, such as a C-axis aligned crystal (CAAC) or organic light-emitting diode (OLED) display that produces a high definition (HD) output and which can be mounted on the curved surface of the pillars.

A flexible digital screen attached on the front pillar transmitting the processed digital signal of the external view cameras uncovers the forward oblique blind spots without compromising the structural and passive safety of the vehicle.

The signal of the external view cameras is digitally processed by an oblique view processor (OVP) unit, such that the curved display does not skew the transmitted picture unnecessarily. The three-dimensional (3D) spatial coordinates of the display are preloaded in the OVP and correlate to the focal length of the external view camera.

A closed circuit connecting the external cameras to the flexible OLED displays, through the digital oblique view processing unit, ensures that the driver receives a smooth and realistic forward oblique view picture across the expanse of the windshield.

DRAWINGS

DESCRIPTION

Figure 3:
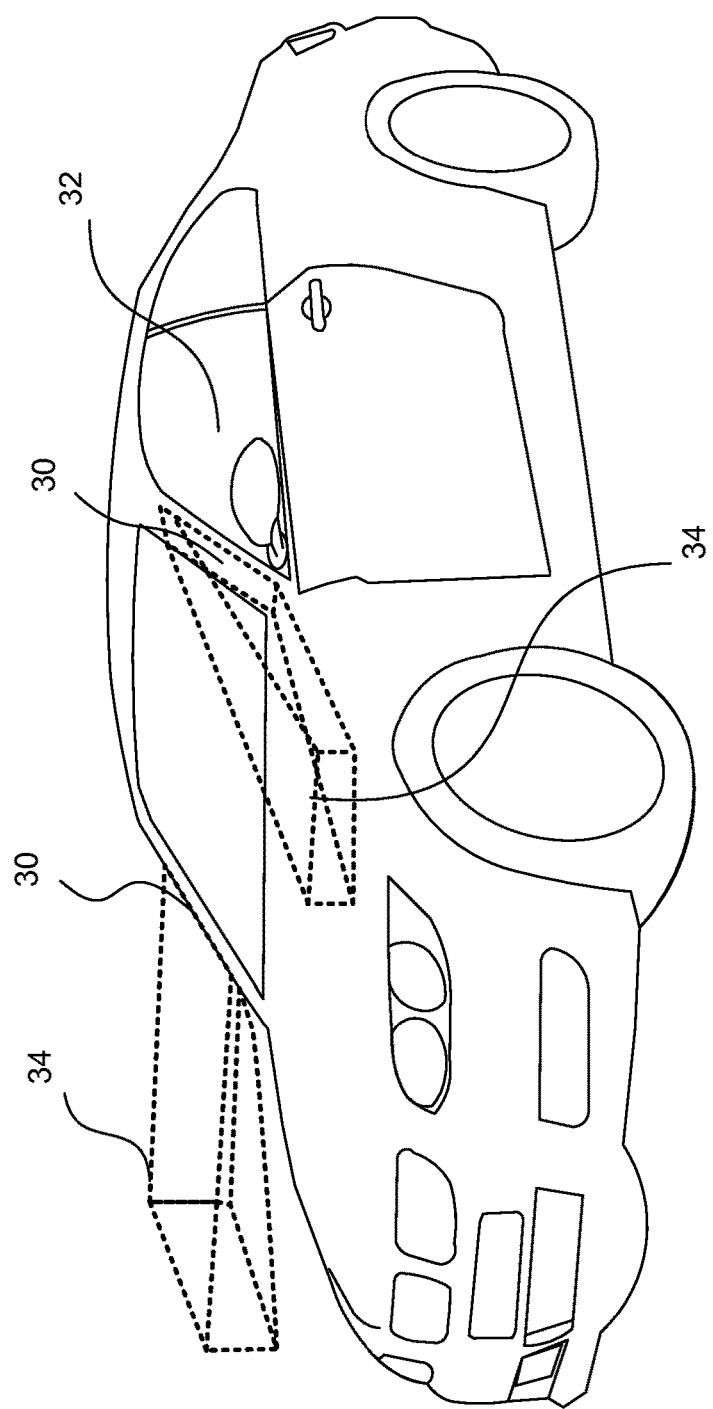
FIG. 3 is a perspective view of a motor vehicle showing the forward oblique blind spot from the driver's position, emphasizing the significance of the front pillar's view obstruction.

FIG. 3 shows a typical motor vehicle of sedan type. As can be seen, the front pillars 30, in relation to the operator or driver's seat 32, obstruct the driver's oblique view in both the forward left and right directions. The regions defined by the three-dimensional obstructed-view polyhedra 34 are artificially complemented by the embodiments of the invention presented in detail hereafter.

As the evolution of the front pillars for structural, safety, and aerodynamic reasons led to increasingly thicker dimensions, the forward oblique blind spots became wider. Embodiments of the invention provide a panoramic windshield viewer system, thus eliminating the forward oblique blind spots.

Figure 1:
FIG. 1 shows the problems attendant with the obstruction of driver vision due to the windshield pillar when the driver approaches a roundabout through which a vehicle is proceeding on the driver's left.
Figure 2:
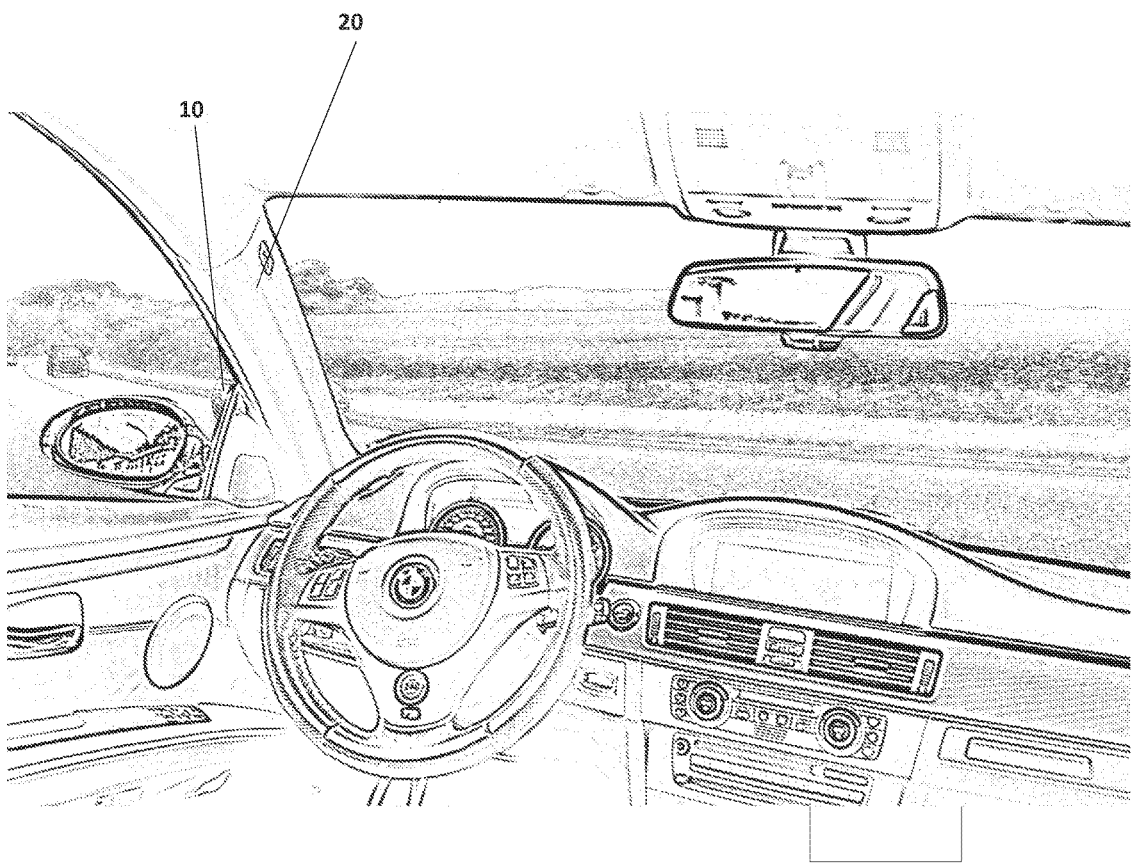
FIG. 2 is a perspective drawing showing the driver's view of the roundabout of FIG. 1 and the obstruction of the driver's vision of a vehicle in the roundabout caused by the windshield support pillars.
Figure 4:
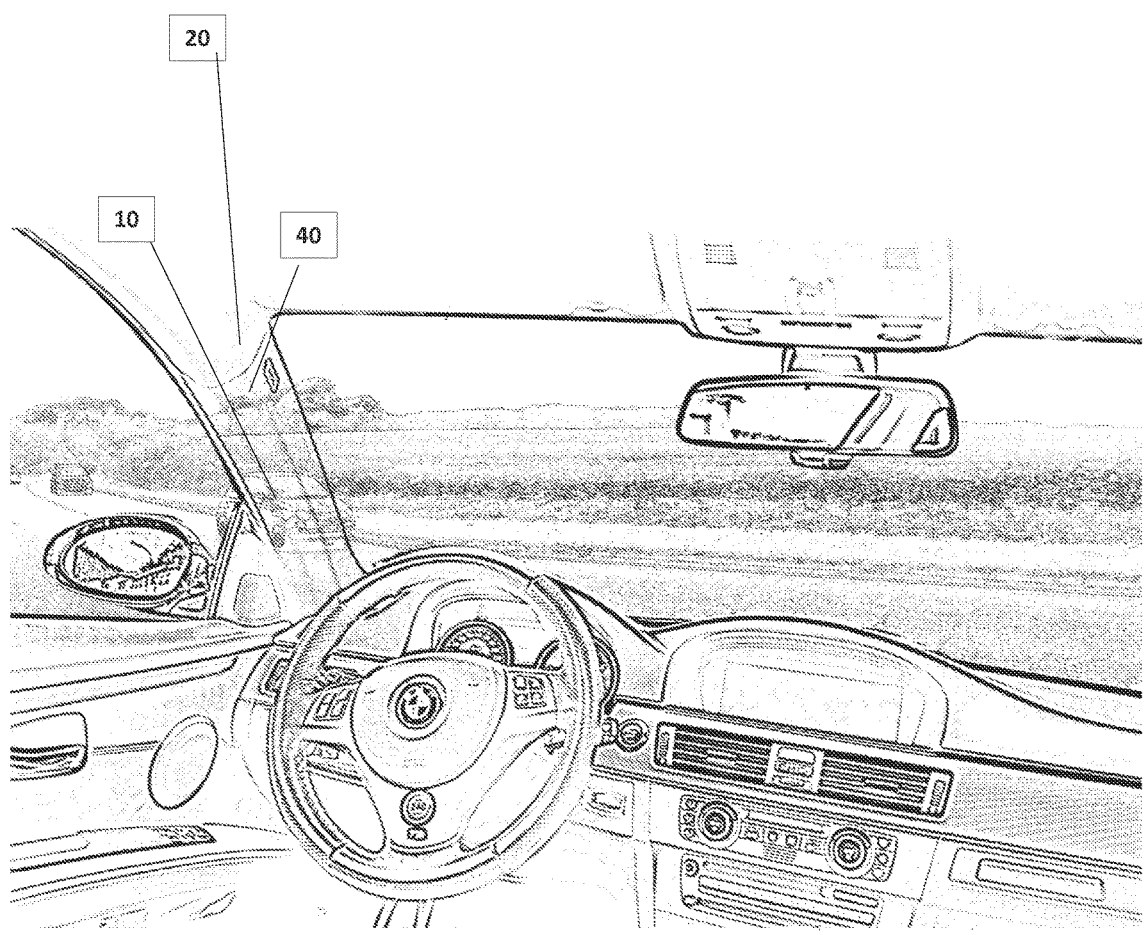
FIG. 4 shows the view from the driver's position through the front windshield, as complemented by two panoramic view enabling devices according to the invention.

FIG. 4 shows the view from the driver's position through the front windshield, as complemented by two panoramic view enabling devices 40. In an embodiment of the invention, these devices consist of two flexible CAAC OLED displays 40 one of each of which is mounted around the front pillars 20 and on top of the underlying airbags, when fitted. The flexible CAAC OLED display units provide the external view that is otherwise obstructed by the front pillars. For example, the vehicle 10 in the roundabout (see FIGS. 1 and 2) is now visible. Those skilled in the art will appreciate that other displays may be used. For example, an LED or plasma display may be fitted into the pillar, etc.

Figure 5:
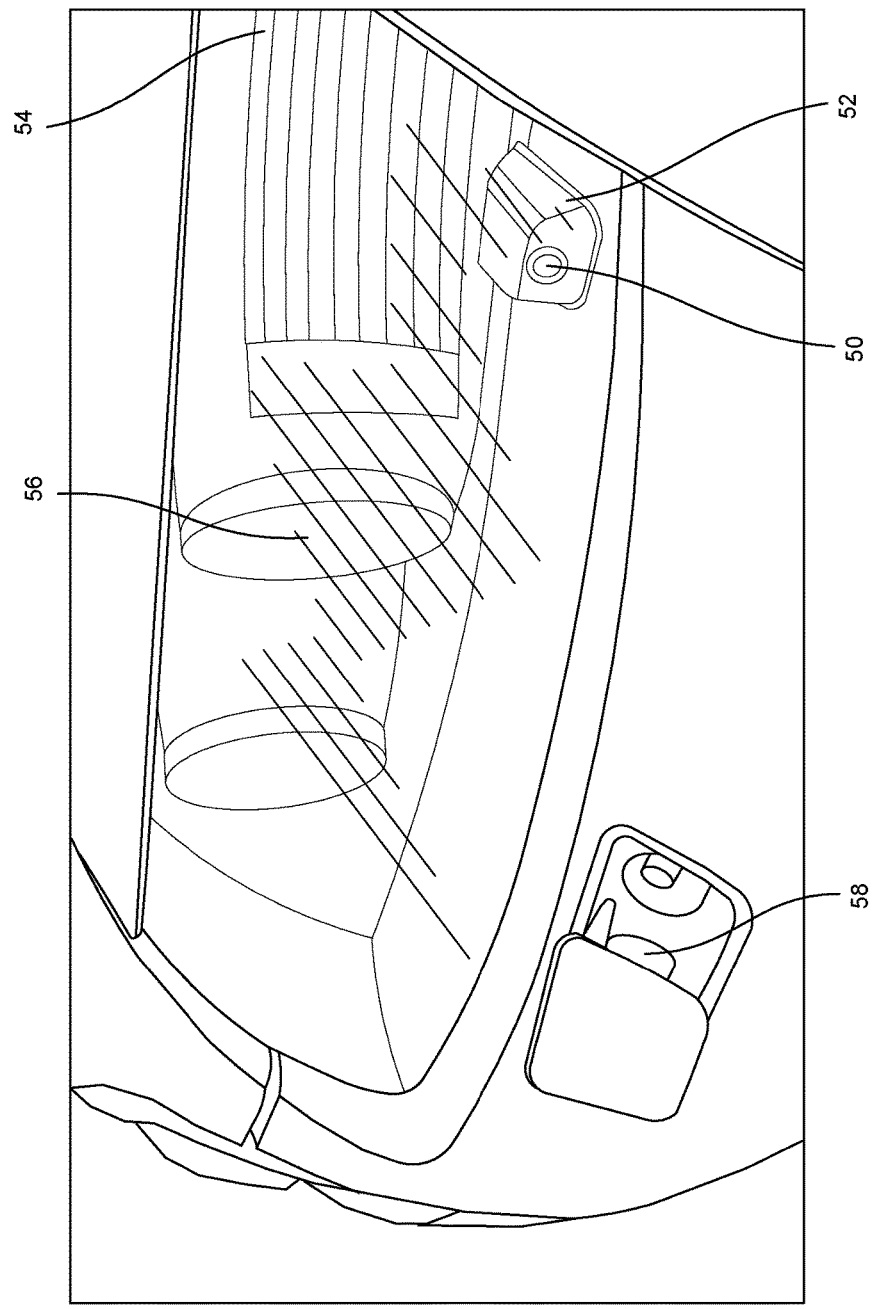
FIG. 5 shows the installation of the external camera behind the lens of the headlights according to the invention.

In embodiments of the invention, the external view camera 50 is implemented in a special mount 52, behind the headlight Plexiglas 54, at the edge or best view-angle with regard to the headlights 56, as illustrated in FIG. 5. The camera is shielded as appropriate to prevent the operation of the headlights from interfering with the ability of the camera to capture an image. In embodiment of the invention, the camera is of complementary metal oxide semiconductor (CMOS) type. Those skilled in the art will appreciate that other types of cameras may be used in connection with the invention, such as a fast small-sized charge-coupled device (CCD) camera An important, although not essential, element of this embodiment of the invention is the headlight washer system 58 which ensures that the camera is not obstructed by mud, insects, or other road stains. The mounting of the oblique view camera at the edge of the headlights ensures an optimal and unobstructed viewing angle. While only one camera on the driver's side of the vehicle is shown in FIG. 5, those skilled in the art will appreciate that a camera is preferably placed at each side of the vehicle, one for each corresponding windshield pillar. In some embodiments of the invention, a single, wide angle camera may be placed at the front, center of the vehicle, for example at a grill area.

Figure 6:
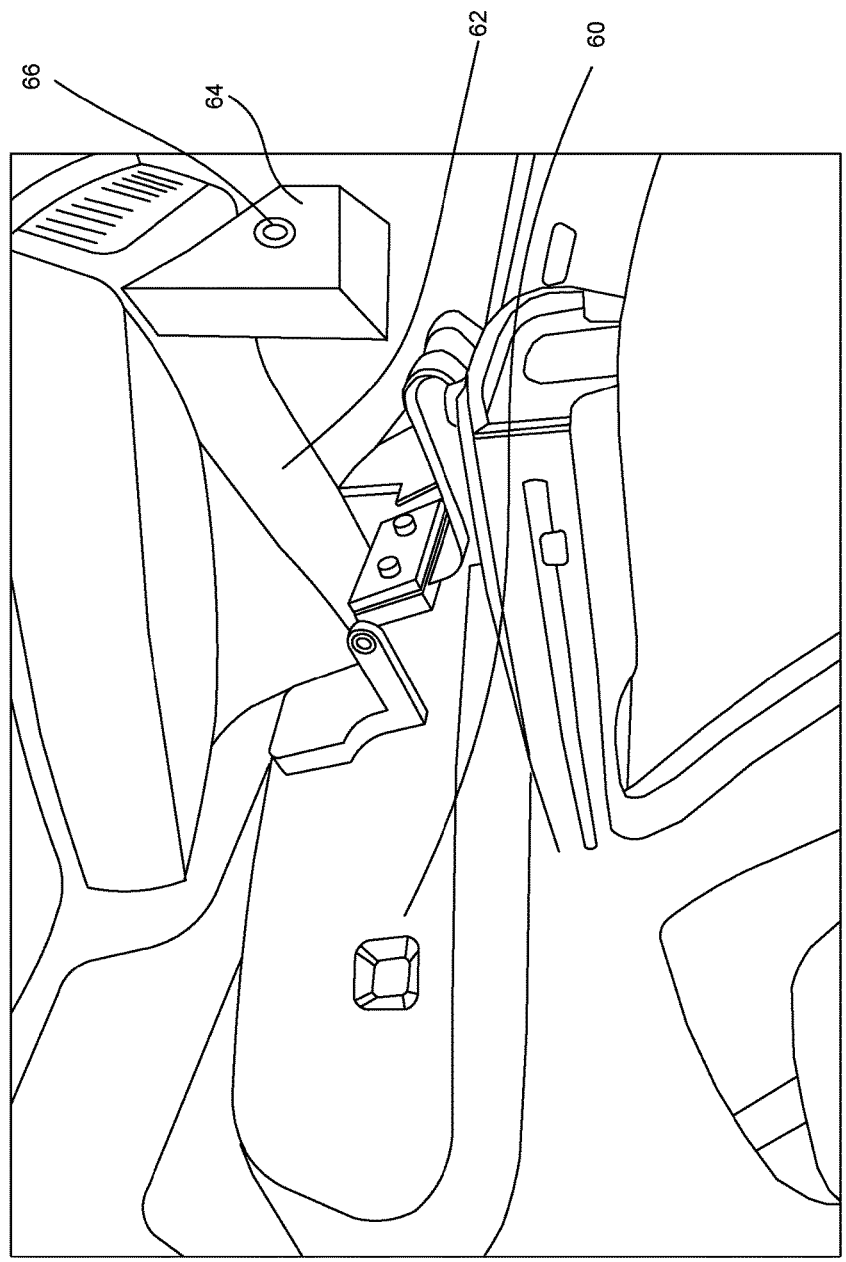
FIG. 6 is a perspective view showing an embodiment of the invention having a behind-the-windshield mounting, in which the left and right cameras are housed in oblique plastic mounts.

The panoramic windshield viewer system can also be embodied by mounting an external view camera 66 within the internal rearview mirror 60 strut 62. In this embodiment, the mounting enclosure 64 is directly attached to the windshield, as is the case for rain or ambient light sensors. In this embodiment of the invention, two cameras, left and right, are mounted to the windshield. Each camera is housed in an oblique mount, as depicted in FIG. 6; or both cameras can be housed in a single mount, each camera pointing left or right as appropriate.

Figure 7:
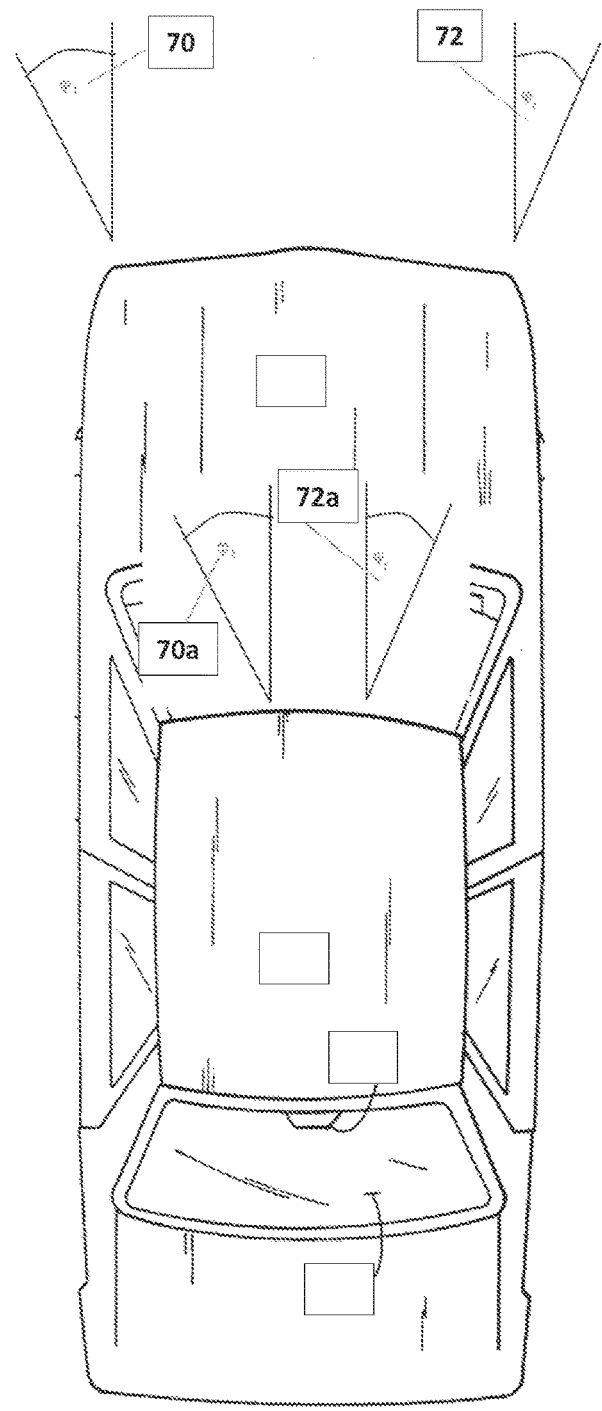
FIG. 7 is a plan view of a motor vehicle showing the cameras' viewing angles left and right on the horizontal level, lateral axis according to the invention.

Because each driver is of different stature and assumes a different driving attitude, it is important that the driver be able to adjust the camera-viewing angle left and right—φl and φr, as illustrated in FIG. 7. The adjustment is either mechanical or digital, depending on the embodiment of the invention. From the standard driver's seat configuration it is apparent that the view obstructed by the front pillars depends on the driver's position, forehead-to-view angle, as well as the driver's posture. It is thus not possible to achieve the display of the exact missing part of the forward oblique views. In the embodiment of the invention in which the mechanical option is implemented, an electric motor adjusts the camera viewing angle 70, 72 in case of a camera located in the headlamp assembly (70a, 72a in the case of a rear view mirror mounted camera assembly) and positions the camera with a mechanism that is similar to that used to position the external rearview mirrors.

Figure 8:
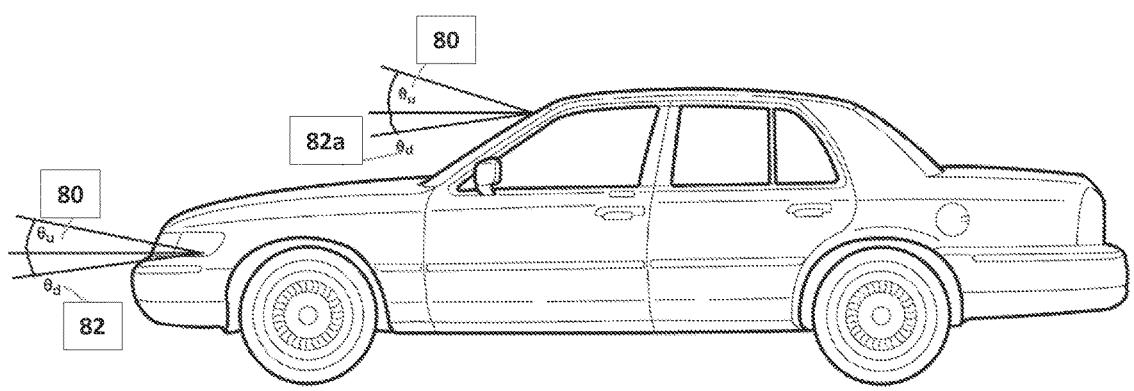
FIG. 8 is a lateral view of a motor vehicle showing the cameras' viewing angles up and down on the vertical level, longitudinal axis according to the invention.

The lateral view adjustment is complemented with the vertical level viewing angle correction shown in FIG. 8. The up and down camera angles θu and θd, 80, 82, respectively (80a, 82a in the case of a rear view mirror mounted camera assembly) permit the driver to adjust the vertical viewing angle according to his forehead height.

Figure 9:
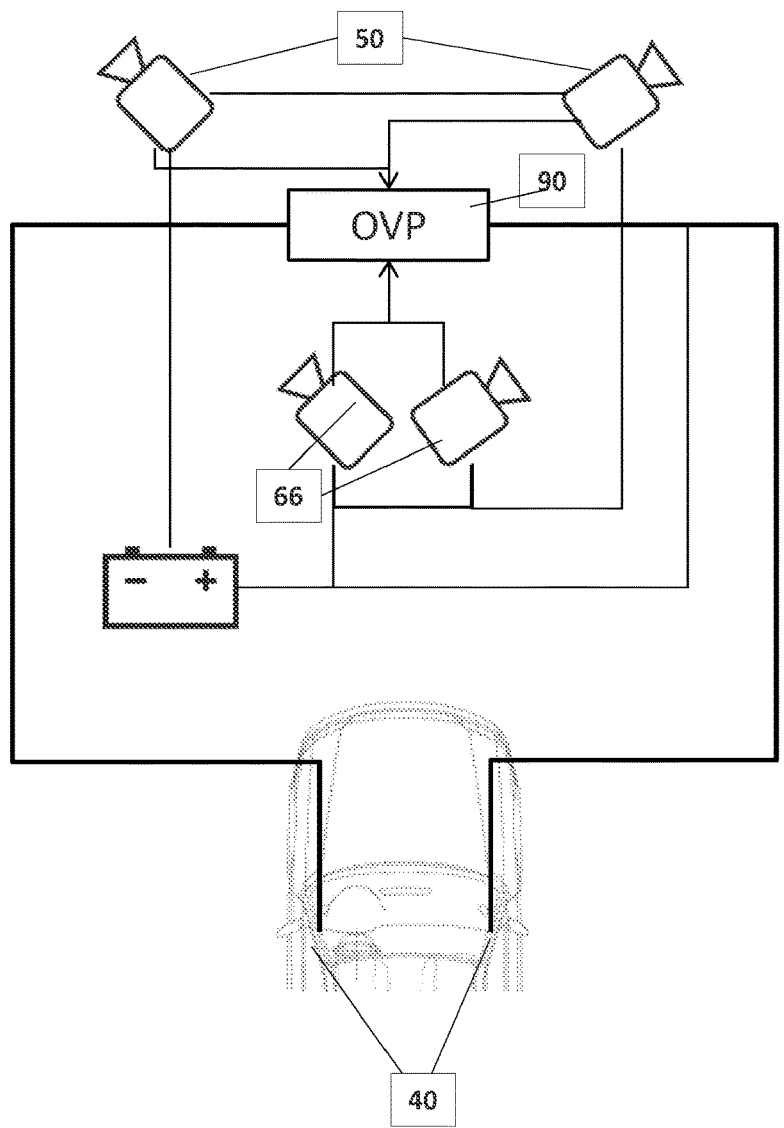
FIG. 9 is a block schematic diagram showing an oblique view processor connected with the camera and the light sensor via an a bus according to the invention.

FIG. 9 is a block schematic diagram showing an oblique view processor (OVP) connected with the camera and the light sensor via a bus according to the invention. In an embodiment of the invention, a combined signal and power bus connects the external view cameras 50 with the OVP 90. The processor sends a signal to the flexible CAAC OLED display 40 that is mounted around the front pillar. The processor crops the digital image so that the exact physical view of the portion of the scene obstructed by the pillars is displayed on the CAAC OLED display.

Figure 10:
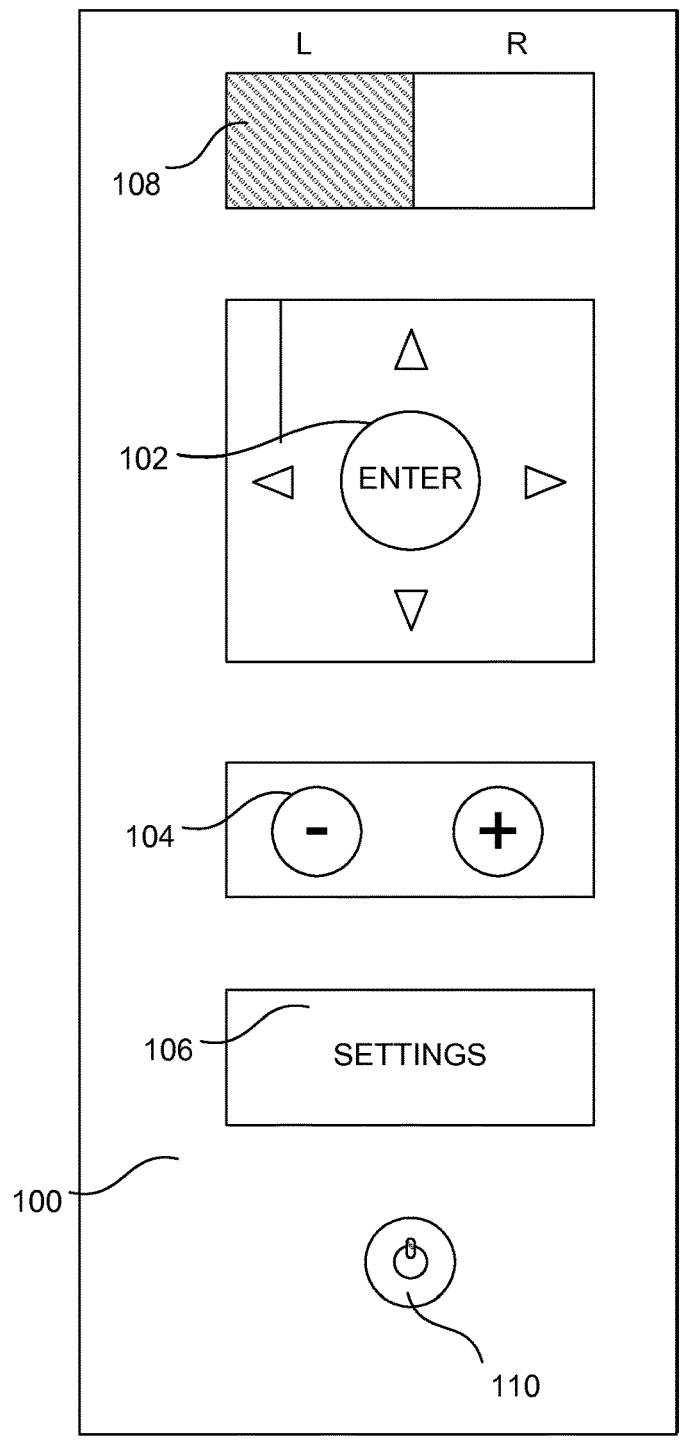
FIG. 10 is a plan view showing an arrangement of the control unit buttons according to the invention.
Figure 11:
FIG. 11 is an image showing cropping logic with the control unit according to the invention.

The cropping area is defined by the control unit 100, shown in FIG. 10. As the driver uses the left-right arrows, the displayed area shifts so that the missing scene can be clearly viewed. In the most complete embodiment of the invention, a zoom camera complemented by a two-axis motor delivers a better quality digital raw picture. The digital raw picture can then be cropped and adapted for display on a high definition OLED display 40 via the control unit 100 (see FIG. 11). As is the case with the external rear-view mirrors, an absolutely seamless display of the front oblique view cannot be guaranteed, given that the exact driver's position cannot be constant. When the driver's position relevant to the front pillars changes, the viewing angle changes too and theoretically the displayed picture should be altered. In the present form of the embodiment the driver needs to adapt the viewing angles with the control unit 100, if his eyes' position is altered significantly.

Figure 12:
FIG. 12 is an image showing digital zoom and viewing angle adjustment according to the invention.

In an embodiment of the invention, the camera viewing angle is altered algorithmically by cropping the camera's digital input as shown in FIG. 12. This method is slightly different than having an electric motor mechanically adjust the external view camera. The viewing angle's adjustment in this case is achieved by using a shorter focal length that provides a wider view digital image. This view is then digitally side-cropped by the OVP, so that it fits the driver's desired oblique viewing angle. In this embodiment of the invention, the viewing angle is changed by the control unit 100, by moving the crop area inside the available digital data. The same logic happens for the zoom function that in this case is digital.

The oblique view processor unit determines the amount image distortion that is due to the convex shape of the OLED display. The displayed image is corrected according to the exact focal length of the trimmed display with respect to the viewing area.

Figure 13:
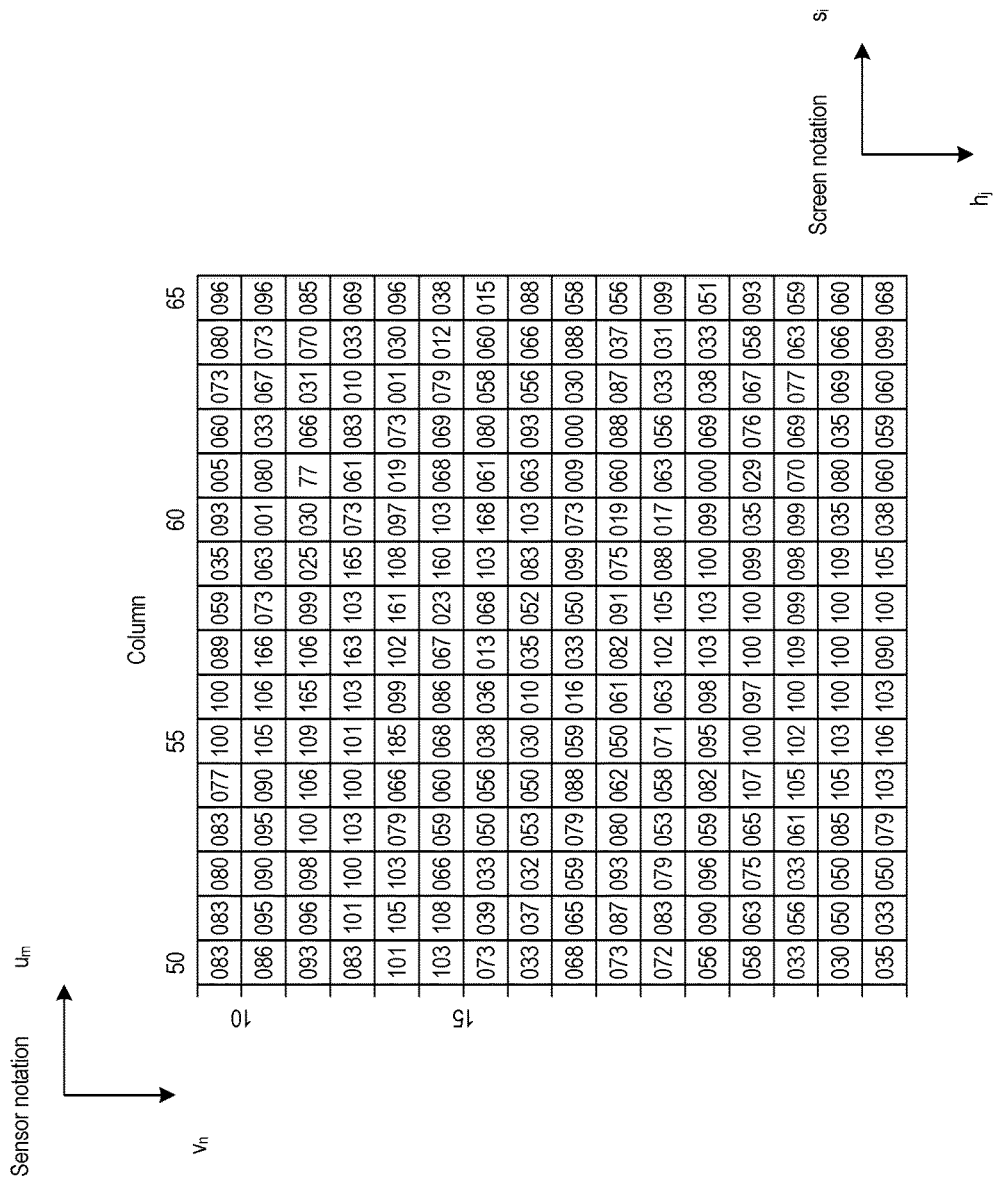
FIG. 13 shows a demosaiced sensor/digital display data structure with one channel per RGB (Red Green Blue) according to the invention.

FIG. 13 shows the data structure of processed censor or display digital data. The canvas shown schematically correspond to pixel data per RGB color. The same schematic applies to sensor data per color channel. The sensor is in most cases structured as an RGB Bayer color filter. Each RGB value is locally sensed by the corresponding photosite. The resulting image resembles a mosaic that is processed with several available processing algorithms. Demosaicing can be performed with linear interpolation involving several photosites, usually referred-to as pixels, spline or other formulae. The output of digital data is in the form of bits. Each color is defined in the 0 to 255 digital scale. The full color or 16.7 million colors output is defined by a 32 bit word, where each color is described by 8 bits. Because the flexible OLED display 40 is curved, a mathematical process known as image warping needs to be considered. Image warping is usually applied to correct distorted 3D captured data for a 2D graphical representation. In the present case, the inverse logic is needed. The 3D flexible display needs to realistically show a 2D scene as captured by the camera. In the present terminology, the term "3D" should not be confused with the 3D viewing technology employed in filming and depth-sensing TVs. The term "3D" corresponds to the curved surface of the pillar trim 20 that is covered by the OLED flexible display 40.

Figure 14:
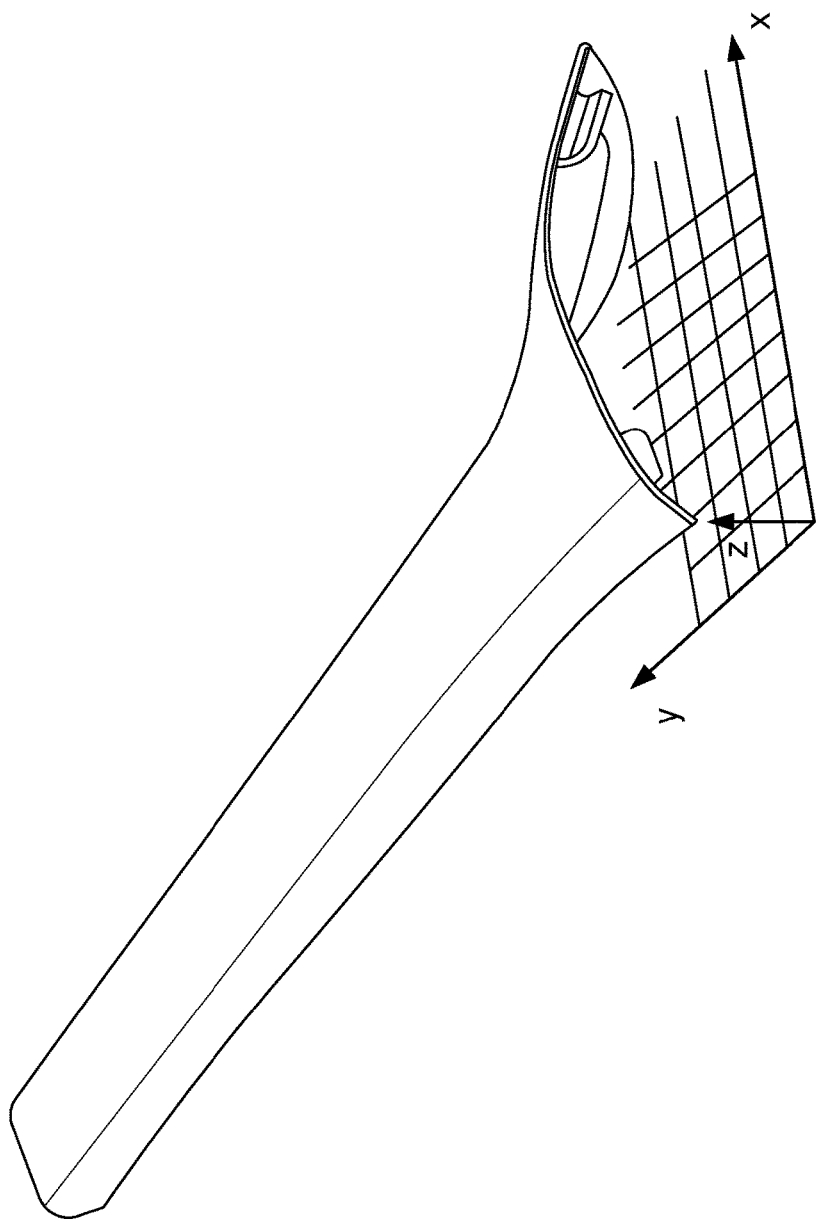
FIG. 14 shows a projection of the 3D OLED to the x-y 2D plane according to the invention.
Figure 15:
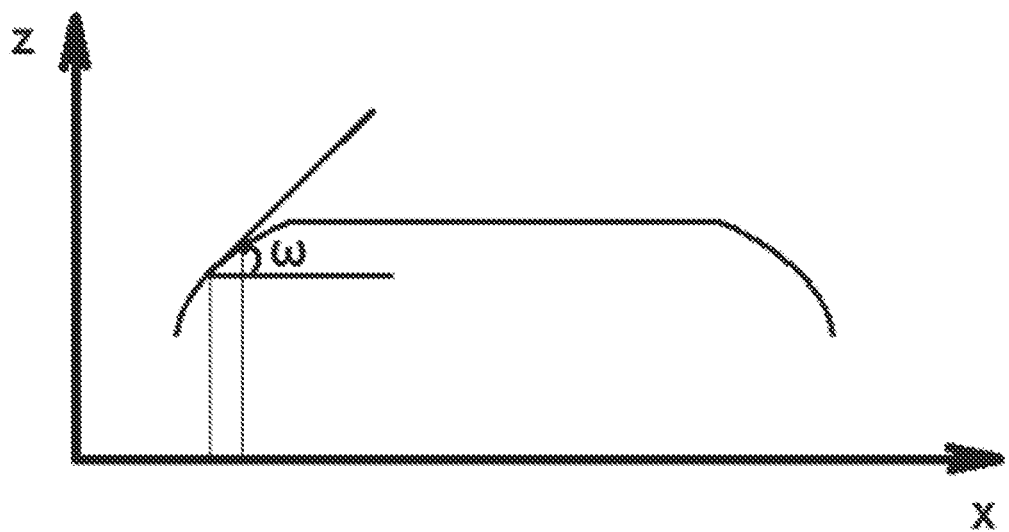
FIG. 15 shows a 2D perspective of the x-z plane according to the invention.

The role of the OVP 90 is to apply the warping process of the curved OLED display 40, so that the driver senses the practically 2D image, as is captured by the front camera 50. This is feasible when the 3D surface of the OLED flexible display is projected on the 2D x-y plane as shown in FIG. 14. The 3D data of the display are stored according to CAD drawings in the OVP 90. The data format can be in the form of (x y z) coordinates. The projection of the x-z plane is shown in FIG. 15. The curve shown in FIG. 15 corresponds to the spread of the OLED display 40. The OLED in a 2D format, as defined by its digital structure can be represented in the s-h coordinate system (FIG. 13). The general processing algorithm is as follows:
1. For each l, j of the OLED display (40)
2. Translate the s-h OLED coordinates to the projected x-y plane. The mathematical formulas of the projection is the following:

$$s(i) = P_l \cdot t$$

Where $P_l$ is the pixel length of the OLED display 40.

$$x(t) = x(t-1) + [s(t-1) - s(t)] \cdot \cos(\omega)$$

The x-y-z coordinates are already known. However they can also be computed by converting the 2-D spread of the OLED to the 2-D x-y projection plane. The angle $\omega$ can be computed according to the formula $$\omega = \arctan\left(\frac{z_i - z_{i-1}}{x_i - x_{i-1}}\right)$$

3. The x-y OLED projection plane can be translated to the sensor plane by the ratio of the sensor displayed area as follows:

$$u(m_r) = x(i) \cdot \frac{u_{max}}{x_{max}}$$

Figure 16:
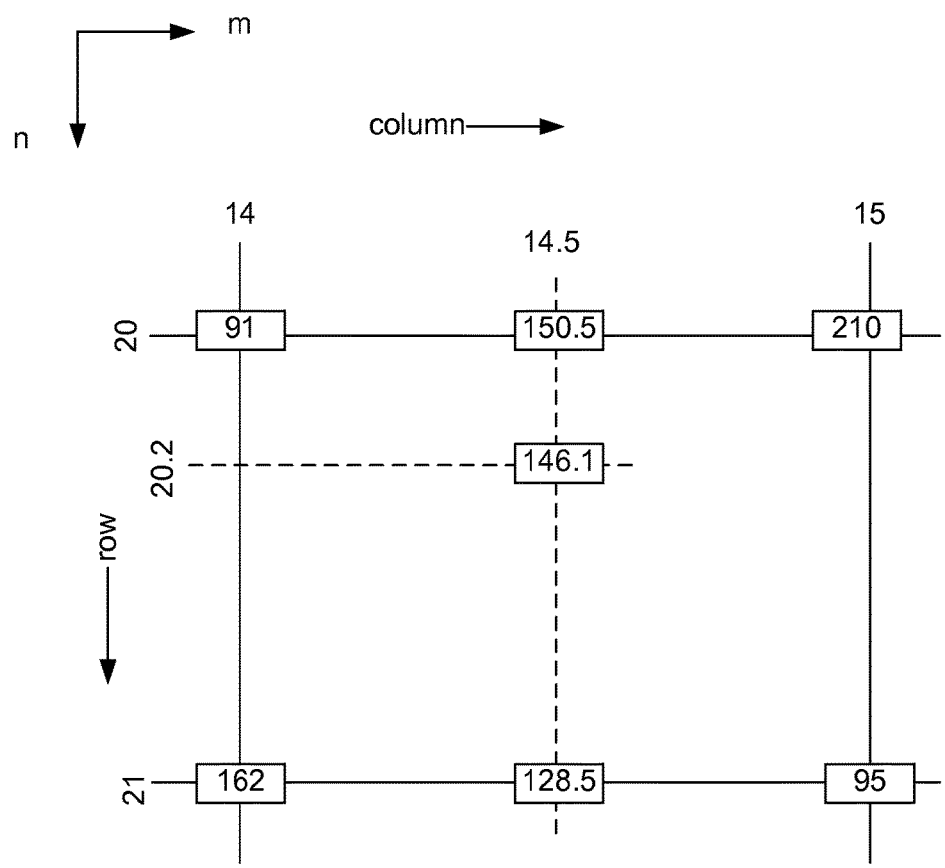
FIG. 16 shows a bi-linear interpolation according to the invention.

4. Finally the $m_r$ indicator on the sensor level can be calculated according to the straightforward relation $$m_r = \frac{u(m_r)}{Ps_l}$$

where $Ps_l$ corresponds to the photosite, or referenced-to as a pixel sensor-length. Analogous equations can be applied to obtain the y-direction real number $n_r$, where the angle on the y-z plane is represented by $\alpha$. It is mathematically certain that both $m_r$ and $n_r$ are not integers. Therefore, an interpolation needs to be applied to obtain the RGB value that is finally displayed in the OLED 40. The most common approach is to apply a bi-linear interpolation as shown in FIG. 16. However the bi-linear interpolation is not the sole method that can be employed. Depending on the curvature of the OLED flexible display 40, several interpolating methods can be used. Bi-cubic interpolation, or an interpolation depending on statistical results, such as a probability density function of the adjacent photosites/pixels can be employed in advanced embodiments of the invention.

In embodiments of the invention, the external view camera includes an auto-focus lens having focal length variation. The focal length varies automatically depending on the vehicle velocity, by default. This is necessary because the human eye focuses to more distant objects as the velocity increases. It is the driver's natural behavior to focus to objects at 300 ft (91.4 m) or more, when the vehicle is moving at speeds more than 50 miles/h (80 Km/h). The driver has the option to fix the lens' focal length and turn the system off. For security reasons the system is automatically re-enabled after engine restart for speeds up to 50 miles/h (80 Km/h). This system is mostly useful in urban vehicle operation, where the speed is moderate. In suburban circulation it can be progressively useful. The high speed of the vehicle reveals much faster the oblique blind spots.

Figure 17:
FIG. 17 is an image showing a combination of upper and lower camera input according to the invention.

In a more advanced embodiment, the oblique view processor unit blends the input of two different oblique view cameras. A camera installed at the level of the headlights 50 is combined with a camera 66 installed in the internal rearview mirror strut. The digital output can be displayed as a faded image between the two cameras, or with a single separator line or buffer area as shown in FIG. 17.

Night mode operation is supported by a surrounding light sensor. Such a sensor is already available in most modern vehicles to turn the headlights on automatically, dim the dashboard lighting, and adjust the brightness of digital in-vehicle screens. The sensor complements the automatic aperture handling of the camera and is directly connected to the oblique view processor unit. Thus, the camera aperture is set as appropriate for night lighting. In embodiments of the invention, a night vision camera sensor may be used as well.

In embodiments of the invention, the panoramic windshield viewer system is complemented with an electronic control unit 100 (see FIG. 10). The control unit is commanded by the driver and provides controls 108 that select the left or right cameras to adjust the oblique viewing angle and vertical viewing angle via a four way control button 102. The focal length of the camera lens is adjusted by a zoom button 104, and a button may be provided (not shown) by which the display brightness is adjusted. The electronic control unit provides a control 106 for access to an on screen setting menu that allows the driver to set a speed at which the system is automatically turned off. A power button 110 allows the driver to switch the system on and off at will. In embodiments of the invention, the control unit is not an separate unit, but is integrated into an overall vehicle command system, such as an entertainment and navigation system.

Computer Implementation

Figure 18:
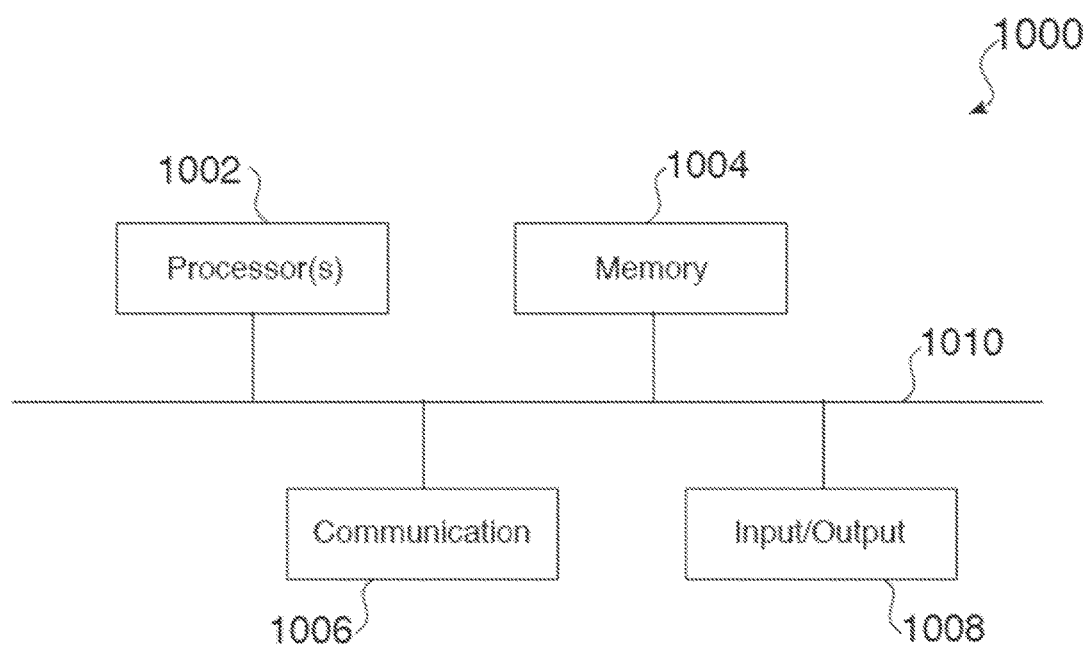
FIG. 18 is a block schematic diagram showing a machine in the example form of a computer system within which a set of instructions for causing the machine to perform one or more of the methodologies discussed herein may be executed.

FIG. 18 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 18, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. For example, the invention may also be used to provide a panoramic view to the rear of the vehicle, for example where the driver's vision to the rear is obstructed by vehicle roof supports and the like. Accordingly, the invention should only be limited by the Claims included below.

The invention claimed is:

1. An apparatus for panoramic display to an operator of a vehicle of a forward and oblique, partially obstructed view through a vehicle windshield, comprising:

at least one external camera positioned relative to said vehicle to capture an image of an obstructed portion of said view;

a processor configured for receiving said captured image from said at least one camera and for processing said captured image for display;

a display positioned relative to an obstruction and receiving from said processor for display on said obstruction the obstructed portion of the view captured as an image by said camera, wherein said display comprises a curved, flexible display for realistically depicting a scene as captured by the camera, said display comprising an CAAC OLED device, said display further comprising a flexible display attached to a front vehicle windshield pillar facing said driver;

said processor applying image warping to correct distorted captured image data for a graphical representation on said display as follows:

for each I, j of the OLED display, translate s-h OLED coordinates to a projected x-y plane in accordance with:

$$s(i)=P_I \cdot t$$

where $P_I$ is the pixel length of the OLED display; and said processor configured for scaling and cropping said image to provide said panoramic display in which the obstructed portion of the view is replaced by said image captured by said camera.

2. The apparatus of claim 1, further comprising:
amount for said at least one camera to position said at least one camera relative to either the vehicle headlights, side mirror, or internal rearview mirror strut.

3. The apparatus of claim 1, further comprising:
an electrically driven motor for positioning said camera any of up, down, left, and right.

4. An apparatus of claim 1, further comprising:
said processor digitally processing and cropping said image captured by said camera to provide an appropriate driver viewing angle.

5. An apparatus of claim 1, further comprising:
said processor receiving an image captured by a camera having a lens having a short focal length that provides a raw picture that is wider than said obstructed portion of said view;
said processor adjusting said picture perspective to provide an image at the driver's preferred viewing angle; and
said processor cropping areas of said picture that are not within the obstructed portion of said view.

6. An apparatus of claim 1, further comprising:
a speed-dependent autofocus system configured to provide the driver with an optimal view of forward oblique blind spots.

7. The apparatus of claim 6, said autofocus system further comprising:
a driver operated mechanism for selecting and adjusting a fixed focal length.

8. An apparatus of claim 1, further comprising:
said processor configured for combining or blending digital input from at least two cameras into a single output signal.

9. The apparatus of claim 3, further comprising:
a light sensor proximate to said at least one camera for automatically adjusting camera sensitivity in response to day, night, or dim light conditions.

10. The apparatus of claim 1, further comprising:
said processor applying a warping process for images provided to said display to present to the driver an image on a curved surface as is captured by the camera.

11. A method for panoramic display to an operator of a vehicle of a forward and oblique, partially obstructed view through a vehicle windshield, comprising:
positioning at least one external camera relative to said vehicle to capture an image of an obstructed portion of said view;
a processor receiving said captured image from said at least one camera and for processing said captured image for display;
positioning a display relative to an obstruction and receiving from said processor for display on said obstruction the obstructed portion of the view captured as an image by said camera, wherein said display comprises a curved, flexible display for realistically depicting a scene as captured by the camera, said display comprising an CAAC OLED device, said display further comprising a flexible display attached to a front vehicle windshield pillar facing said driver;
said processor applying image warping to correct distorted captured image data for a graphical representation on said display as follows:
for each I, j of the OLED display, translate s-h OLED coordinates to a projected x-y plane in accordance with:

$$s(i) = P_I t$$

where $P_I$ is the pixel length of the OLED display; and
said processor scaling and cropping said image to provide said panoramic display in which the obstructed portion of the view is replaced by said image captured by said camera.

12. The method of claim 11, further comprising:
said processor applying a warping process for images provided to said display to present to the driver an image on a curved surface as is captured by the camera.

* * * * *